Oct. 3, 1961 R. SUHRMANN 3,003,028

CIRCUIT ARRANGEMENT FOR RE-INTRODUCING THE DIRECT CURRENT COMPONENT OF A VIDEO SIGNAL

Filed Nov. 12, 1957

INVENTOR

ROBERT SUHRMANN

BY Frank R. Jifani

AGENT

United States Patent Office 3,003,028

Patented Oct. 3, 1961

3,003,028

CIRCUIT ARRANGEMENT FOR RE-INTRODUCING THE DIRECT CURRENT COMPONENT OF A VIDEO SIGNAL

Robert Suhrmann, Hamburg-Rahlstedt, Germany, assignor to North American Philips Company, Inc., New York, N.Y., a corporation of Delaware Filed Nov. 12, 1957, Ser. No. 695,890
Claims priority, application Germany Dec. 15, 1956
8 Claims. (Cl. 178—7.3)

This invention relates to circuit-arrangements for re-introducing direct current component of a detected television signal supplied via an amplifier without direct current coupling, in which the video signal thus obtained is supplied to a bridge-circuit comprising two unilaterally conductive elements and a number of coupling elements, to which bridge-circuit there are also supplied two gating pulses of opposed polarities when the incoming television signal has a reference value.

The gating pulses, having opposed polarities, may be taken from two winding halves of a transformer, or from a phase-inverter stage, while the transformer or the phase-inverter stage is controlled by the synchronisation pulse or by a pulse from a trigger circuit.

However, the use of additional transformer windings or of a phase inverter stage involves undue complication.

The present invention has for its object to obviate these disadvantages and is based on the recognition that each time only one of the two conductive elements need be made conductive to fix the reference value of the video signal. Hence, it is not necessary for the two pulses to occur simultaneously, provided only that the signal has approximately the same reference value during the occurrence of the two pulses. This is true, for example, if one pulse is applied during the front porch and the other is applied during the back porch of the line synchronisation signal present in the video signal. Of course, this also holds if the two pulses occur during the front porch or during the back porch.

In accordance with the invention this is achieved in a simple manner by means of a circuit arrangement having the feature that the gating pulses are obtained by differentiation of the first pulse, preferably the line synchronisation pulse or the fly-back pulse from the line time base.

If one diode becomes conductive a small abrupt variation of the grid voltage of the video output valve occurs, which variation is sometimes visible in the picture by lighting up of the picture screen during flyback, but this can be avoided by equipping the picture tube with a device for suppressing the cathode-ray beam during the fly-back, which device is independent of the control of the video output valve. Such flyback-suppressing circuits are often used in known circuit arrangements.

Figure 1:
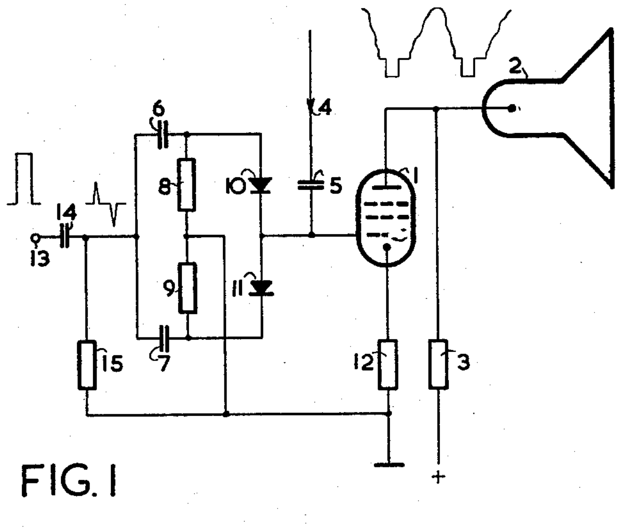
Figure 2:
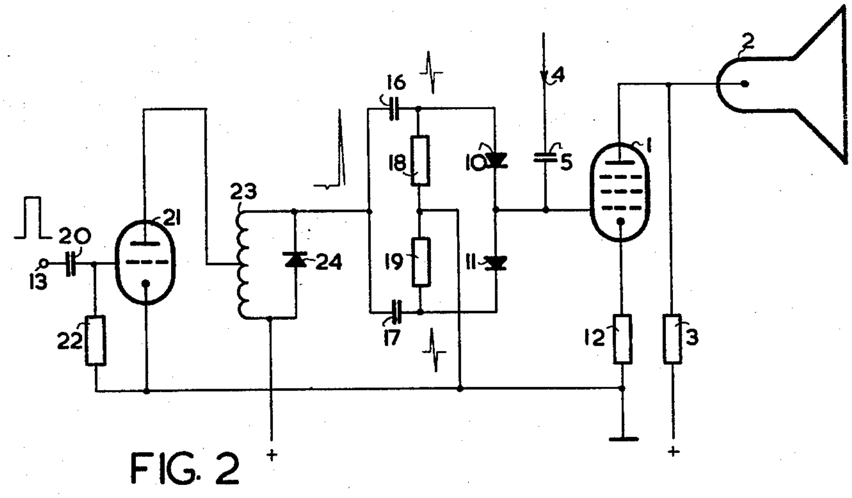

In order that the invention may be readily carried into effect, an example will now be described in detail with reference to the accompanying drawing, in which:

FIG. 1 is a circuit diagram of a direct current restoring system according to one embodiment of the invention; and FIG. 2 is a circuit diagram of a direct current restoring system according to another embodiment of the invention.

FIG. 1 shows an amplifier valve 1, the anode of which is connected to the cathode of a picture tube 2 and through a resistor 3 to the positive terminal of a supply, the other end of which is earthed, said valve 1 being given suitable potentials in known manner (not indicated in the drawing). Through the lead 4 and the coupling capacitor 5 the video signal is applied to the control grid of the amplifying valve 1 operating as a pentode.

The cathode of the valve 1 is earthed through a resistor 12, by means of which the operating point is set.

Provision is further made of a phase-bridge and, normally, gating pulses having opposed polarities are supplied through capacitors 6 and 7 to the series-combination of two, preferably equal resistors 8 and 9, the junction point of which is connected to a point of constant potential, for example earth. The series-combination of the resistors 8, 9 is connected in parallel with the series-combination of two diodes 10 and 11, while the cathode of the diode 10 is connected to the anode of the diode 11, and said junction point is connected to the control grid of the output valve 1.

The gating pulses occur if the video signal has a reference value, for example black level, when the signal appearing at the grid of the valve 1 is impressed via conductive diodes 10 and 11 on the point of fixed potential (in the present case earth potential). The coupling capacitor 5 is now either charged or discharged according as to whether the reference value of the supplied video signal at the instant of gating differs upwardly or downwardly from earth potential. Since, consequently, the capacitor need be charged only in one direction or in the other it is sufficient to make only one of the diodes 10 or 11 conductive each time.

Therefore, it is possible to apply gating pulses not occurring at the same instant, which permits these pulses to be produced in a simpler manner.

According to the invention, this is effected by supplying a first pulse, for example the line synchronisation pulse or a line flyback pulse from the line time base to a differentiating member at 13, which member comprises a series-capacitor 14 and a parallel resistor 15, the time constant of which is small relative to the pulse time. This yields two narrow oppositely directed pulses at the output of said differentiating member, which pulses occur during the leading edge and the trailing edge of the first pulse respectively. These pulses are supplied both to the capacitor 6 and to the capacitor 7 through a common lead.

As stated before, this yields the desired reintroduction of the direct current component. The gating pulses occur approximately during the front porch and during the back porch. By preceding deformation and/or shifting known per se of the first pulse provision can be made that the gating pulses fulfil this requirement to a sufficient degree of accuracy.

If the television receiver also comprises a so-called flywheel synchronisation circuit with a phase-bridge, in which the synchronisation pulses of the video-signal are compared with the flyback pulses of the line time base, which yields a regulating voltage for varying the natural frequency of the line deflection generator, a phase displacement often occurs between the synchronisation pulses and the flyback pulses. Owing to a phase displacement between the pulse wave supplied at 13 and the video signal the gating pulses from the leading edge and the trailing edge no longer coincide with the end of the front porch and the beginning of the back porch in the video signal and therefore it is advisable to use as a first pulse a line synchronisation pulse obtained from the syncnronisation signal, which line synchronisation pulse may, if desired, be derived from the synchronisation separator connected, for example, to the output circuit of the valve 1.

FIG. 2 shows a circuit arrangement corresponding to FIG. 1 in respect of the parts 1 to 5 and 12.

In FIG. 2, the first pulse is supplied from the terminal 13 through a coupling capacitor 20 to the grid of an amplifying valve 21. The valve shown is a triode but may alternatively be a different amplifier element, in particular a pentode.

The cathode of the amplifying valve 21 is connected directly to earth. Its grid is connected to earth through a leakage resistor 22. The positive-going pulses supplied at 13 or, as the case may be, the complete video-signal with positive going pulses produce, as a result of the occurrence of grid current, the required bias on the capacitor 20 so that the peaks of the pulses have earth potential. In the output circuit of the valve 21, there occur current pulses corresponding to the synchronisation pulses, which current pulses pass between the anode and the positive terminal of the supply through part of an inductance 23. As a result of this inductance 23, which may have a value of approximately 0.5 mh., the current pulses are differentiated and at the beginning and at the end of the first pulse there are produced two sharp oppositely directed pulses, the first of which is suppressed by a rectifier 24 connected in parallel with the inductance. The remaining positive peak is supplied through capacitors 16, 17 to earthed resistors 18, 19.

The series-combination of two rectifiers 10, 11 is connected in parallel with said resistors 18, 19. The arrangement 16, 17, 18, 19, 10 and 11 constitutes a phase-bridge as described with reference to FIG. 1. In FIG. 2 the capacitors 16, 17 and the resistors 18, 19 are such as to differentiate the supplied positive pulse so as to produce a short positive and a short negative pulse immediately succeeding each other, which pulses render the diodes 10 and 11 conductive respectively and re-introduce the direct current component to the grid of the valve 1.

Since the sharp pulses lie closely adjacent each other the circuit may be set so that the arrangement operates on one of the two porches, preferably on the back porch.

The valve 21 may serve in known manner for separating and amplifying the synchronisation pulses for synchronising the horizontal and vertical deflection generators. Further external resistors may be connected preferably between the inductance 23 and the supply.

The inexpensive inductance 23 may comprise a ferromagnetic core, for example consisting of high-frequency ferrite.

Alternatively the resistors 8, 9 and 18, 19 respectively may be potentiometers with variable tappings which, if desired permit adjustment of the symmetry of the circuit.

What is claimed is:

1. A circuit arrangement for reintroducing the direct current component of a video signal having recurrent portions of given reference signal value comprising, two unilaterally conductive elements connected in a series circuit in front-to-back relationship, capacitor means for applying the said video signal to the junction of said two unilaterally conductive elements, first and second series connected impedance means connected in parallel with said series circuit, means connecting the junction of said impedance means to a reference potential, input means for a pulse signal recurring during the interval of said recurrent portions of said video signal, means for deriving from said pulse signal pulses of opposite polarity recurring at consecutive time periods, and capacitor means for applying said last-mentioned pulses to the said series connected unilaterally conductive elements thereby to render said elements alternately conductive at consecutive time periods.

2. A circuit arrangement for reintroducing the direct current component of a video signal having recurrent portions of given reference signal value comprising, two unilaterally conductive elements connected in a series circuit in front-to-back relationship and two impedance elements forming with said two unilaterally conductive elements a bridge circuit arrangement having two pairs of diagonal connecting points, capacitor means for applying the said video signal to one point of one of said pair of points, means connecting the other point of said one pair of points to a reference potential, input means for a pulse signal recurring during the interval of said recurrent portions of said video signal, means for differentiating said pulse signal and capacitor means for applying said differentiated pulse signal to the second of said pairs of diagonal connecting points thereby to render said elements alternately conductive at consecutive time periods.

3. A circuit arrangement as claimed in claim 2, wherein said differentiating means comprises a resistance-capacitance network having a time constant short relative to the duration of said pulse signal.

4. A circuit arrangement for reintroducing the direct current component of a video signal having recurrent portions of given reference signal value comprising, two unilaterally conductive elements connected in a series circuit in front-to-back relationship and two resistance elements connected in series and forming with said two unilaterally conductive elements a bridge circuit arrangement, a capacitor having one terminal connected to the junction of said series connected unilaterally conductive elements, means for applying the said video signal to the other terminal of said capacitor, means applying a reference potential to the junction of said resistance elements, input means for a pulse signal recurring during the interval of said recurrent portions of said video signal, a resistance-capacitance differentiating network connected to said input means for deriving from said pulse signals two pulses of opposite polarity recurring at consecutive time periods, and capacitance means for applying said two pulses to each of the junctions of the first-mentioned resistance elements and the unilaterally conductive elements thereby to render said last-mentioned elements alternately conductive at consecutive time periods.

5. A circuit arrangement for reintroducing the direct current component of a video signal having recurrent portions of given reference signal value comprising, two unilaterally conductive elements connected in a series circuit in front-to-back relationship and two resistance elements forming with said two unilaterally conductive elements a bridge circuit arrangement, capacitor means for applying the said video signal to the junction of the said two unilaterally conductive elements, means applying a reference potential to the junction of said resistance elements, input means for a pulse signal recurring during the interval of said recurrent portions of said video signal, first and second capacitance means each connected between said input means and a respective one of the junctions between said resistance elements and said unilaterally conductive elements, said capacitance means and resistance elements forming networks having time constants short relative to the duration of said pulse signal thereby differentiating said pulse signal and rendering said unilaterally conductive elements alternately conductive at consecutive time periods.

6. A circuit arrangement for reintroducing the direct current component of a video signal having recurrent portions of given reference signal value comprising, two unilaterally conductive elements connected in a series circuit in front-to-back relationship, capacitor means for applying the said video signal to the junction of said two unilaterally conductive elements, two series connected impedance means connected in parallel with said series circuit, means connecting a reference potential to the junction of said two impedance means, input means for a pulse signal recurring during the interval of said recurrent portions of said video signal, first means for differentiating said pulse signal thereby to produce two pulses of opposite polarity recurring at consecutive time periods, means for suppressing one of said last-mentioned pulses, second means for differentiating the other said two pulses thereby to produce two pulses of opposite polarity recurring at consecutive time periods, and capacitor means for applying said last-mentioned two pulses to the said series connected unilaterally conductive elements thereby to render said elements alternately conductive at consecutive time periods.

7. A circuit arrangement as claimed in claim 6, wherein said suppressing means for one of said pulses comprises a rectifier element poled so as to suppress the first of the two pulses produced.

8. A circuit arrangement as claimed in claim 6, wherein said first differentiating means comprises an inductance.

References Cited in the file of this patent

UNITED STATES PATENTS

| | | |
|---|---|---|
| 2,299,945 | Wendt | Oct. 27, 1942 |
| 2,500,839 | Lord | Mar. 14, 1950 |
| 2,525,106 | Wendt | Oct. 10, 1950 |
| 2,539,774 | Gluyas | Jan. 30, 1951 |
| 2,564,017 | Maggio | Aug. 14, 1951 |
| 2,630,486 | Rieke | Mar. 3, 1953 |
| 2,636,080 | Doba | Apr. 21, 1953 |
| 2,792,496 | Rhodes | May 14, 1957 |

FOREIGN PATENTS

| | | |
|---|---|---|
| 498,164 | Canada | Dec. 1, 1953 |
| 620,478 | Great Britain | Mar. 25, 1949 |
| 696,121 | Great Britain | Aug. 26, 1953 |